(No Model.)

J. J. TOWLE.
FRUIT DRIER.

No. 284,579. Patented Sept. 4, 1883.

WITNESSES:
Donn Twitchell
C. Sedgwick

INVENTOR:
J. J. Towle
BY
Munn & Co
ATTORNEYS.

UNITED STATES PATENT OFFICE.

JOHN J. TOWLE, OF DIXFIELD, MAINE.

FRUIT-DRIER.

SPECIFICATION forming part of Letters Patent No. 284,579, dated September 4, 1883.

Application filed March 20, 1883. (No model.)

*To all whom it may concern:*

Be it known that I, JOHN J. TOWLE, of Dixfield, in the county of Oxford and State of Maine, have invented a new and Improved Fruit-Evaporator, of which the following is a full, clear, and exact description.

My invention consists of a vertical cylindrical case, between which and an inside vertical hollow cylindrical drum there is a spiral flue, in which the fruit to be dried is caused to pass from bottom to top several times around the case by pushing the trays containing the fruit forward successively from an opening at the bottom, where they are put in one after another, to an opening at the top, where they issue from the flue, the flue being also a passage for hot air from the furnace at the base of the case, and the central drum being a chamber in which the products of combustion from the furnace circulate for giving up their heat also to the drying of the fruit, thus making a simple, compact, and economical drier, all as hereinafter fully described.

Reference is to be had to the accompanying drawings, forming part of this specification, in which similar letters of reference indicate corresponding parts in all the figures.

Figure 1:
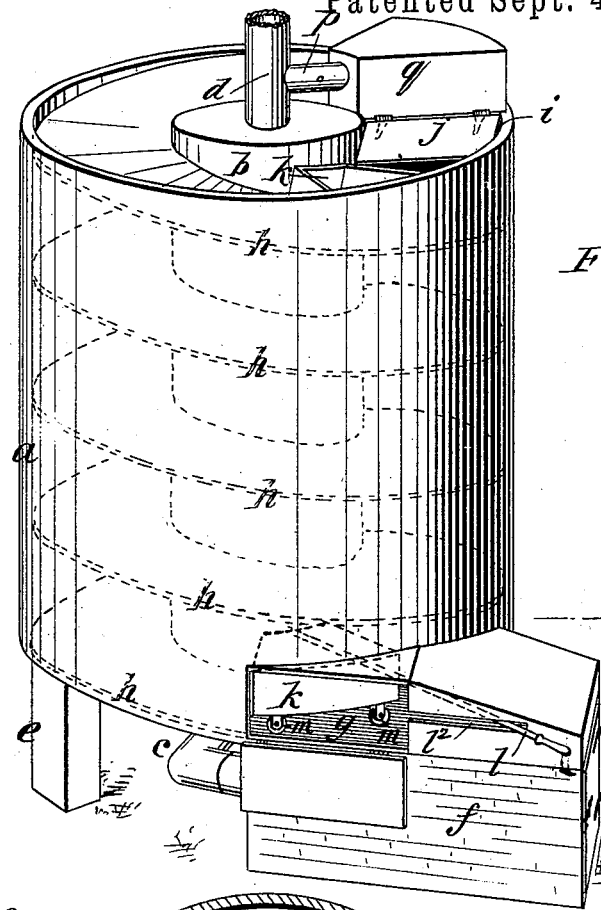
Figure 3:
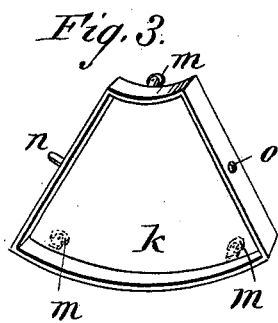
Figure 4:
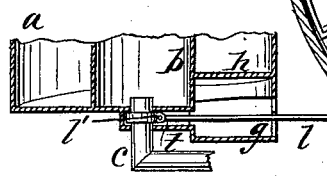
Figure 2:
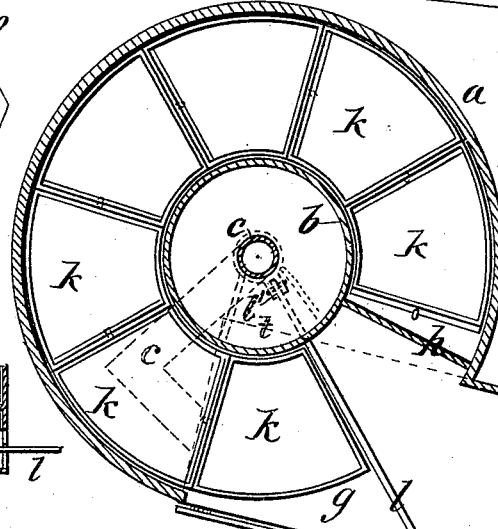

Figure 1 is a perspective view of my improved drier or evaporator with a portion of the case broken away, and Fig. 2 is a perspective view of one of the trays employed for passing the fruit through the drier. Fig. 3 is a perspective view of one of the trays. Fig. 4 is a vertical section, on a small scale, through the drum $h$, showing the connection of the actuating-lever $l$.

I make a cylindrical case, $a$, of wood or other approved material, except where the parts are too much exposed to the heat of the furnace, with closed ends, and having a central drum, $b$, extending through it from end to end and being closed at its ends, except for connecting a smoke-pipe, $c$, at the bottom and another one, $d$, at the top, and I set up said case endwise on any suitable foundation, $e$, and arrange a furnace, $f$, in suitable proximity to it for discharging hot air from the furnace into the lower end of the case. From an opening, $g$, into the bottom of this case I arrange a spiral partition between it and the drum $b$, and indicated by the dotted lines $h$, passing several times round the case and rising to the top, where it terminates at $i$, and has a door, $j$, hinged to it to fall down and close the flue formed by it, in which the fruit is to be passed from bottom to top by trays $k$, of suitable approximate triangular form, which are to be shoved into the flue at the bottom through opening $g$, and pushed along up the flue successively by hand, or by a lever, $l$, or other approved means, the trays being put in and pushed along at suitable intervals of time to allow the trays to occupy the flue sufficient time in the passage for the fruit to be dried. The lever $l$ is supported at its inner end on a pin passed through it and projections of a collar, $l'$, which is loose to turn upon the pipe or flue $c$, the lever being arranged below drum $b$, and projecting into an inclosure, $t$, back of the opening $g$, which inclosure prevents the escape of heat from said opening $g$, and affords a support vertically for the lever and its collar, as will be understood from Fig. 4, while the outer end of the lever works across the spiral flue $h$, through the opening $g$, and in the slot $l^2$ of the furnace-cap, so that the lever may be freely swung back to admit a tray, $k$, and then swung forward to force the series of trays upward through the flue $h$, as will be understood from Fig. 2.

The trays are to be mounted on rollers $m$, to move easily, and they have a dowel-pin, $n$, on one side and pin-hole $o$ on the other, to be self-guiding around the spiral way, and prevent being crowded against the inside of the case.

There will be a damper or regulating gate or slide at the lower end of the spiral flue to regulate the air, and I propose to connect the top of the flue, behind the door $j$, with the smoke-pipe $d$, by a pipe, $p$, and a chamber, $q$, over the top of the spiral flue, into which the hot air and vapors from the drying-flue escape, to be drawn away by the pipe $d$, which causes the requisite draft through the drying-flue for the desired circulation therein, and for carrying off the aqueous and other vapors dried out of the fruit, a damper will be employed in the pipe $p$ for regulating its action.

Having thus described my invention, I claim as new and desire to secure by Letters Patent—

1. In a fruit-evaporator, the combination, with the cylindrical case $a$, of the central cylindrical drum, $b$, between which and the case $a$ is arranged a spiral partition, $h$, extending continuously from the bottom to the top thereof, and from the side opening, $g$, to the top opening, $i$, closed by the door $j$, furnace $f$, and means for conducting the products of combustion to the central drum, substantially as and for the purpose set forth.

2. The trays $k$, constructed and arranged to traverse a spiral drying-flue, and having dowel $n$ and dowel-hole $o$ for self-guides, substantially as described.

3. The combination of a lever, $l$, with a drying-case having a spiral drying-flue, substantially as described.

JOHN J. TOWLE.

Witnesses:
   EZEKIEL T. LUDDEN,
   MAURICE G. FULLER.